Sept. 27, 1932.  R. S. ALLYN  1,880,118
CANDLE HOLDER MACHINE AND PROCESS
Filed Feb. 28, 1930
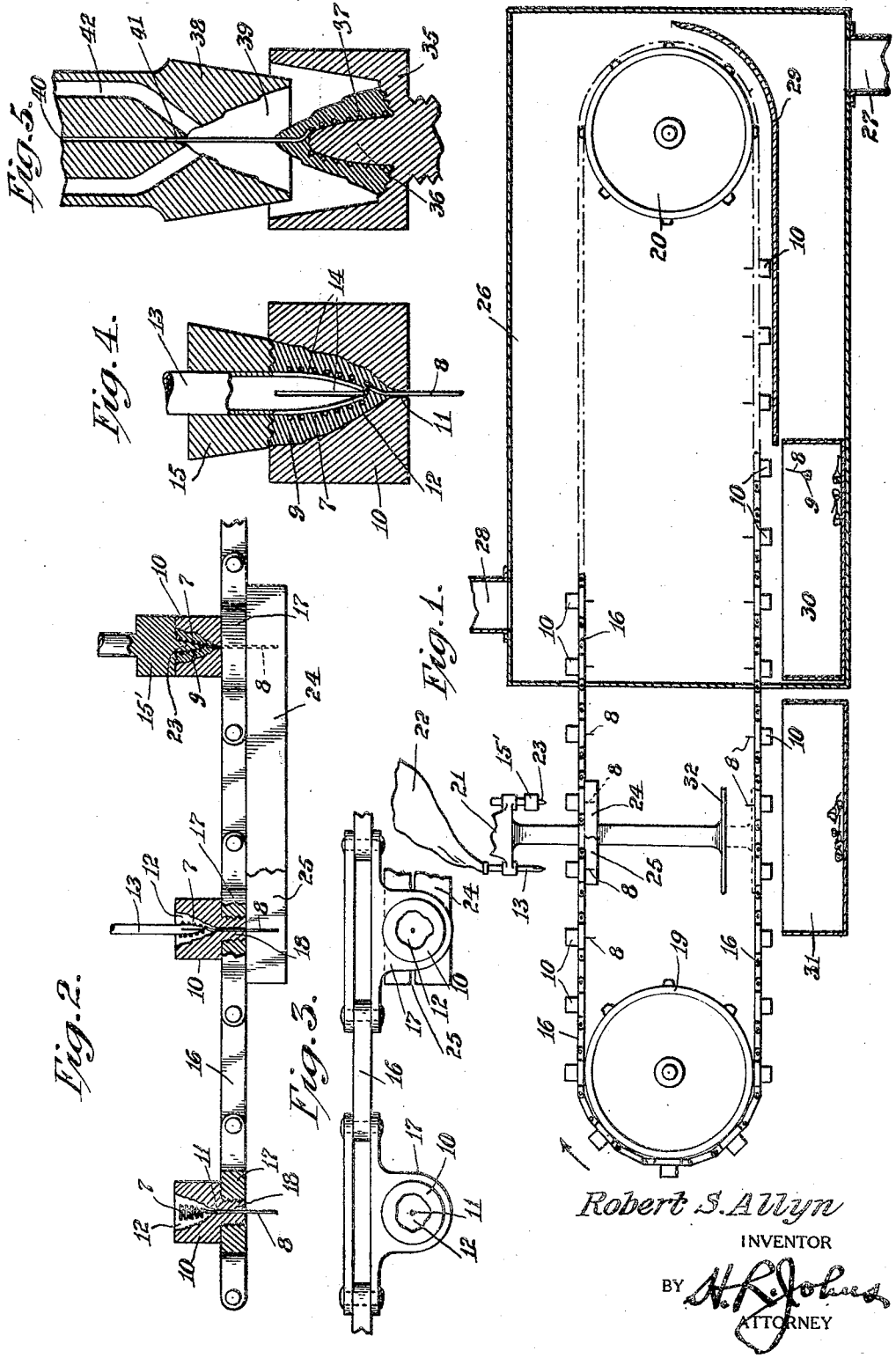
Robert S. Allyn
INVENTOR Patented Sept. 27, 1932

1,880,118

UNITED STATES PATENT OFFICE

ROBERT S. ALLYN, OF BROOKLYN, NEW YORK, ASSIGNOR, BY DIRECT AND MESNE ASSIGNMENTS, OF ONE-HALF TO CYPRESS NOVELTY CORPORATION, OF BROOKLYN, NEW YORK, A CORPORATION OF NEW YORK, AND ONE-HALF TO N. D. Q. SPECIALTY CORPORATION, A CORPORATION OF NEW YORK

CANDLE HOLDER MACHINE AND PROCESS

Application filed February 28, 1930. Serial No. 432,116.

This invention relates to the production of what are commonly termed birthday cake candleholders. These holders consist of wire forms to which is applied plastic material commonly termed icing. The wire form consists of a helix forming a socket for the candle and a stem which serves as a support. According to prior practice the plastic material is applied by a hand operation during which the form is rotated and the plastic material is squeezed from a bag and squirted onto the rotating form. The usual shape thus produced simulates a rose or rosebud.

The main object of this invention is to provide a machine and process for the automatic manufacture of such holders so that they can be produced rapidly and uniformly.

Another object is to provide a machine and method by which various designs can be produced.

Another object is to provide a method of production which will reduce the cost of manufacture.

Another object is to provide a method of manufacture which insures the quick drying of the product so that the holders can be immediately packed and shipped as soon as they are made.

The invention is capable of embodiment in various forms, of which two are illustrated herein.

The invention contemplates the employment of a series of dies which are automatically actuated. Each die is formed of two parts one of which is adapted to support the wire form and provide a portion of the surface ornamenting area. The other part of the die serves to complete the outer surface of the plastic material.

The plastic material is injected or squeezed into the space between the dies. One part of each die is carried by a suitable conveyor which preferably passes through a drying or evaporating chamber. The other portion of each die is intermittently reciprocated to coact with the portion which carries the wire form. When the holders are completed provision is made for their automatic ejection from the dies.

Fig. 1 is a side view and partial section showing one form of apparatus for carrying out the invention.

Fig. 2 is a detail longitudinal sectional view and side elevation showing a portion of the conveyor with the attached traveling die elements and coacting injecting and compressing elements.

Fig. 3 is a fragmentary plan view showing a portion of the conveyor and two of the die elements.

Fig. 4 is a vertical sectional view on a larger scale showing a modified form of die in the closed position.

Fig. 5 is a sectional view of another form of die construction with the parts of each partially separated.

The general construction and method of operation can be perhaps best understood by first considering the illustration of Fig. 4 in which the wire form consists of the helical socket member 7 having the stem 8. The body 9 is of plastic material commonly known as icing, which is moistened and may include some form of preservative to prevent fermentation.

The lower part of the die 10 has a passage 11 for the stem of the wire form and a recess 12 whose wall is of a suitable conformation to produce such outward design of the holder as may be desired. The plunger 13 is shaped at its lower end so as to fit within the socket portion 7 of the wire form. This plunger may be tubular or hollow and provided with a number of openings or slots 14 so that the plastic material may be forced through and injected between the spaced coils of the helix 7 in the space 12 of the die 10. The die member 15 is shaped on its lower edge to produce the desired conformation of the upper edge of the holder when it is pressed down into the position shown in Fig. 4. These die members 15 may be guided on the plunger 13 or separately mounted as shown at 15' in Figs. 1 and 2.

The die members 10 are suitably mounted on some form of moving carrier or conveyor such for instance as a chain 16. For this purpose projections 17 are attached to or form a part of some of the links of the chain and the die parts 10 may be suitably secured to this projection 17 as for instance by means of screw threaded shank 18.

The conveyor is designed to travel in sprockets or wheels such as 19 and 20 which may be rotated intermittently to produce the desired step-by-step action of the traveling die parts.

The other parts of the dies are carried by reciprocating plunger 21 which may also carry the injecting plunger 13 which is supplied with the icing or plastic material from the reservoir or bag 22.

In the form shown in Figs. 1 and 2 the upper die member 15' is mounted independently of the injecting and centering plunger 13 and is provided with its own centering projecting or plunger 23 which fits into the socket portion 7 of the holder and thus keeps the space inside the holder clear and prevents the icing from being forced back into the socket by the action of the die part 15'. The dies may be given additional support beneath the plunger by means of an anvil 24 which may be slotted at 25 to permit of the passage of the stems of the holder. This anvil 24 serves to support the projections 17 of the conveyor.

It will be understood that the plunger 21 with the injecting outlet 13 and the forming die 15' is actuated intermittently while the conveyor 16 is stationary. It should be understood, however, that the plunger might have a simultaneous horizontal traveling movement with the conveyor as is commonly done in dial and chain conveyor devices employing plunger operations.

Immediately after the holders have been formed as above described they may be caused to travel through a heating and drying oven 26 through which hot air is passed, for instance in the inlet 27 and out through the exit 28. This rapidly removes the moisture in the plastic material so that the holders harden very quickly. This also serves as a convenient and desirable means for removing any disagreeable odor which may arise from the vaporization of the moisture content of the plastic material.

To prevent the holders from falling out of the dies when the conveyor travels beneath the sprocket wheel 20 a guard 29 may be provided. At the end of this guard is provided a receptacle 30 for receiving the finished holders, which drop out by gravity. An additional receptacle 31 may be provided beneath the plunger 32 so that any of the holders which have failed to be disengaged by gravity may be forced out by a blow of the plunger 32 which is on the lower end of plunger 21.

In the modified arrangement of Fig. 5 the dies are inverted. The lower die member 35 is provided with a projection 36 which serves to center the helix 37. The upper die member 38 has a recess 39 shaped in accordance with the desired outline of the finished holder. This upper die has a passage 40 for the stem 41 of the form. In this case one or more passages 42 is provided in the upper die member for injecting of the plastic material. It will be understood that the lower die member 35 will be mounted in a suitable dial or chain conveyor and that the upper die member 38 will be actuated by suitable reciprocating plunger mechanism and that the plastic material will be squirted or ejected into the space 39 at the proper instant. It will be seen that in a mechanism of this character where the plastic composition or material is applied from the outside of the wire form, it is not necessary to have the coils of the form spaced apart from each other as it is where the material is to be squirted through from the inside.

In operation it will be understood that the traveling dies will be automatically operated and that the wire forms can be inserted by hand at the lefthand end of the machine (as viewed in Fig. 1). The plunger with the upper die members are actuated automatically or are actuated by a foot or hand controlled mechanism.

Various changes in construction and details may be made without departing from the spirit or scope of this invention.

I claim:—

1. A candle holder making machine comprising two die elements one having a passage for the stem of a wire form and the other shaped to fit inside the helix of the form and means for injecting plastic material into the space between the dies.

2. A candle holder machine comprising a conveyor having holders for wire socket forms, means for applying plastic material to the outside of the forms, and means for centering the forms and compressing the material on the forms.

3. A candle holder machine comprising a conveyor having holders for wire socket forms, means for automatically applying plastic material to the outside of the forms, means for drying the material and means for automatically removing the candle holders from the form holders.

4. A machine for making candle holders which includes, a conveyor having holders for forms having stems, means for applying plastic material to the outside of the forms and means for automatically engaging the stems and ejecting the finished candle holders.

5. A machine for making candle holders comprising a chain conveyor, holders for wire forms carried by the chain conveyor, means for applying plastic material to the wire forms while in the holders and means for ejecting the forms and the applied material.

6. A candle holder making machine comprising a die for forming the outside of the holders, said die having a passage for the stem of a wire form, a plunger adapted to fit in the center of the form, means for injecting plastic material into the die around the form and means for forming the edge of the plastic material in the die around the wire form.

7. The method of forming a candle holder which comprises forcing plastic material outwardly through the interstices of a wire helix socket and shaping the exterior.

8. The process of making candle holders and the like which comprises placing a socket form in a die, squirting plastic material into the die around the form and compressing the material around the form to form a holder, removing part of the dies to expose a substantial area of the holder, and then passing the holders through heated air.

9. The process of making candle holders which comprises applying plastic material automatically to forms and passing the holders and forms with the outside of the holders exposed, through a heated chamber while removing the vapor from the chamber.

10. The process of making candle holders which comprises automatically applying plastic material to wire forms, subjecting it to pressure and then to a current of hot air flowing over a surface of the holder.

11. In a candle holder machine, means for applying plastic material to a wire form having a stem, means for inverting the form, and means for engaging the stem to discharge the completed holder.

12. In a candle holder making machine, a die having a recess tapered toward the bottom and with a passage for the stem of a form through the bottom, means for forcing plastic material onto a form located in the die recess, a centering member insertable into the form and a pressing member for forming the upper face of the holder while the centering member is holding the form.

13. A candle holder machine comprising a die having an upwardly projecting centering member for supporting a socket form having a stem, means for applying plastic material to the outside of the form supported upon the centering member in the die and a punch member for compressing the material upon the form, said punch member having a passage for the stem.

14. In a candle holder machine, a die having a passage for the stem of a form, a nozzle insertable into a form located in the die for introducing plastic material through a form into the die and a presser member slidable upon the nozzle for compressing the material in the die.

ROBERT S. ALLYN.